W. FELD.
PROCESS OF MAKING AMMONIUM SULFATE AND SULFUR FROM GAS.
APPLICATION FILED MAR. 29, 1911.
1,011,043.
Patented Dec. 5, 1911.
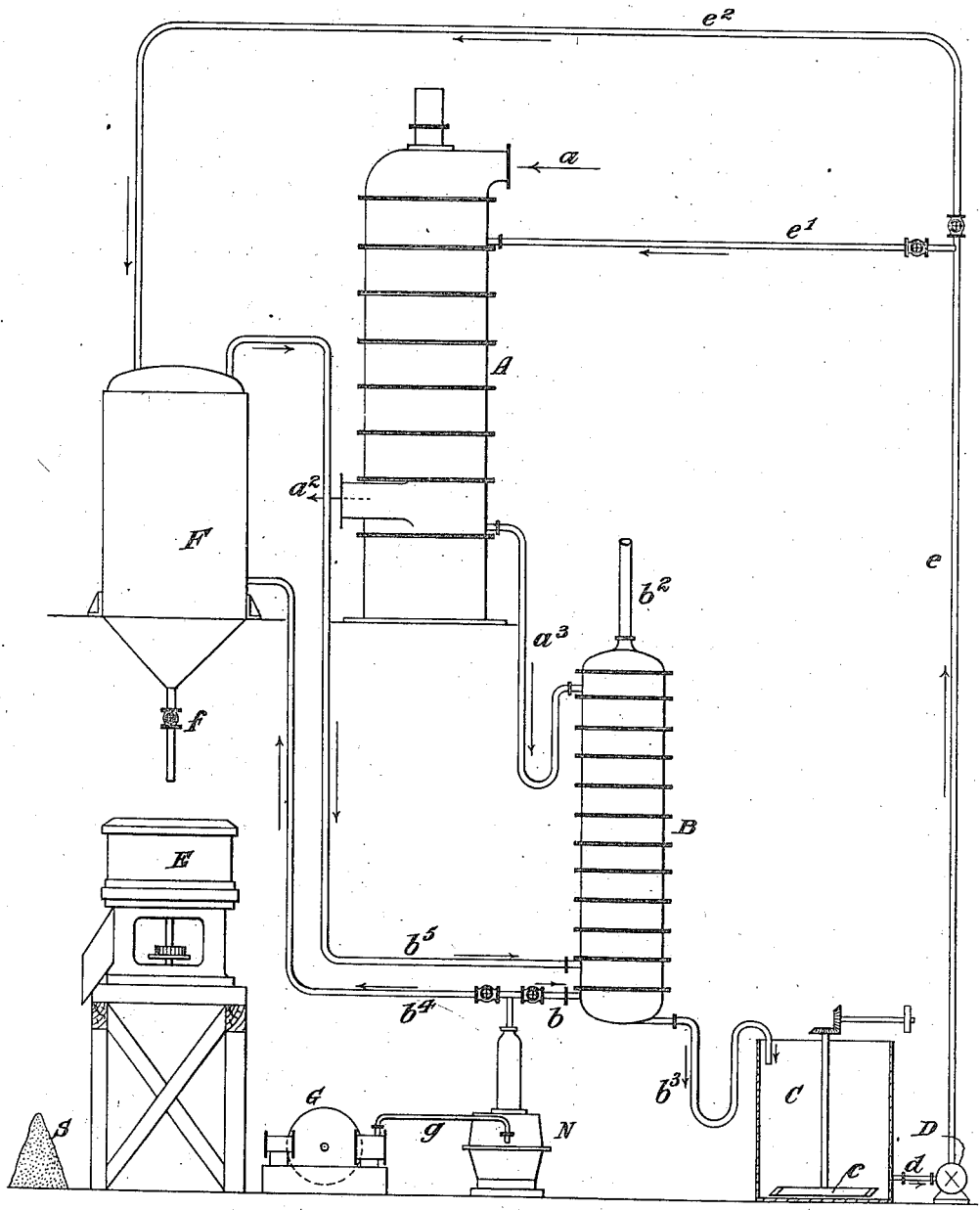
INVENTOR
WALTHER FELD

UNITED STATES PATENT OFFICE.

WALTHER FELD, OF LINZ, GERMANY.

PROCESS OF MAKING AMMONIUM SULFATE AND SULFUR FROM GAS.

1,011,043.     Specification of Letters Patent.     Patented Dec. 5, 1911.

Application filed March 29, 1911. Serial No. 617,676.

*To all whom it may concern:*

Be it known that I, WALTHER FELD, a subject of the King of Prussia and the German Emperor, of Linz-on-the-Rhine, in the German Empire, have invented new and useful improvements in effecting the combination, with sulfurous acid, of ammonia or of ammonia and sulfureted hydrogen contained in gases, vapors, or liquids and the obtainment of ammonium sulfate, of which the following is a specification.

The combination of ammonia and sulfureted hydrogen, contained in gases, vapors, or liquids, by treating the gases, vapors, or liquids with sulfurous acid in the gaseous form, or with free sulfurous acid, or with bisulfites dissolved in water, is known, the action of the sulfurous acid on the ammonia producing ammonium sulfite, while the action of sulfurous acid on sulfureted hydrogen liberates sulfur. This process has the disadvantage that, in consequence of the dissociation of the ammonium sulfite and of the high vapor tension of sulfurous acid, and of ammonia, a part of the sulfurous acid and part of the ammonia are left uncombined. For these same reasons sulfurous acid contained in gases cannot be retained by washing them with ammonia water and the evaporation of solutions containing ammonia sulfite is attended with great losses. Furthermore, the ammonia-sulfite crystals obtained by this known process, will constantly lose ammonia and sulfurous acid and these crystals, on account of their reducing properties, are not suitable for use as a manure. It has been proposed to oxidize the ammonium sulfite into sulfate by treatment with air, but by such treatment ammonia and sulfurous acid are evaporated and lost with the escaping air, and the oxidation is not complete. It has also been proposed to convert the ammonium sulfite into ammonium sulfate, by treatment with sulfuric acid, but this is not practicable as it is the intention of my invention to produce sulfate of ammonia by using the sulfur contained in raw gases, or vapors, or raw liquors, without using sulfuric acid. The aforesaid inconveniences are especially apparent when the gases, vapors or liquids, containing the ammonia, contain no sulfureted hydrogen, or less than one proportion, by weight, or sulfureted hydrogen to one proportion, by weight, of ammonia. I have found that, in order to overcome these disadvantages, it is necessary to avoid the final formation of ammonium sulfite and to control the reaction of the gases, for instance ammonia, or sulfureted hydrogen, or both, with sulfurous acid, in such a way that only thiosulfates, or polythionates, or both, (which I will hereinafter refer to generally as "thionates") are produced. For this purpose it is necessary to carry out the reactions between ammonia and sulfureted hydrogen or either, and sulfurous acid in the presence of such an excess of free sulfur (or a sulfur yielding substance, such as a thionate, a sulfid or polysulfid of an alkali, or an earth-alkali, or ammonia) that only thiosulfate of polythionate will be formed. With gases, vapors, or liquids, which contain more sulfureted hydrogen than is equivalent to the ammonia, it is for instance necessary to supply so much sulfurous acid that, in spite of the slow reaction between sulfurous acid and sulfureted hydrogen, for each proportion, by weight, of ammonia, at least one proportion, by weight, of sulfur is separated. This however, is only possible when there is present such a large excess of sulfureted hydrogen which will render the excess of sulfurous acid harmless. As such regulation is difficult, I prefer to add sulfur (or a sulfur yielding substance) to the liquor with which the gases, vapors or liquids, are treated, the sulfur being obtained either during the process, or from any other source; for instance, finely ground native sulfur may be used. If there be an excess of sulfurous acid I may use, as the sulfur-yielding substance a sulfid or a polysulfid, $(NH_4)_2S_5$ for instance, which will react with sulfurous acid in forming thiosulfate of ammonia and free sulfur. If there be no excess of sulfurous acid, I may add a polythionate $(NH_4)_2S_4O_6$, for instance, which will react with sulfureted hydrogen in forming thiosulfate and free sulfur. Even if there be less sulfureted hydrogen than corresponds to the ammonia only thiosulfate of ammonia will be formed by the simultaneous reaction of ammonia, sulfurous acid and free sulfur, or sulfur yielding substances.

As an excess of sulfur does not affect the reactions, but rather assists them, it is advisable, in all cases, to add an excess of sulfur, or of a sulfur-yielding substance, which addition may be made to the washing liquor either before, during, or after, the washing operation, and the said liquor may be either acid or neutral, or basic. The formation of thiosulfate from sulfite and free sulfur, or a sulfur yielding substance, is however more readily effected in neutral, or basic liquors, than in acid liquors. By the conversion of the ammonia into thionates loss of ammonia and sulfurous acid is avoided, ammonium thiosulfate neutralizing any excess of sulfurous acid in forming ammonium polythionates

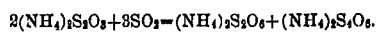

Instead of using free sulfurous acid, compounds may be used which, as is the case with acid sulfites, or polythionates, contain, or act like, free acid under the action of hydogen sulfid, or of other sulfid. If there be more sulfureted hydrogen than ammonia in the gas, I preferably add a polythionate, and if there be none or less sulfureted hydrogen than ammonia in the gas, I preferably add an acid sulfite, but even then I may add a polythionate (which may be either a dithionate, a trithionate, a tetrathionate, or a pentathionate.) A liquor is finally obtained which contains, besides ammonium thiosulfate and polythionates, the sulfur added in excess and eventually part of the sulfur, resulting from the mutual reaction of sulfurous acid, or its substitutes, with sulfureted hydrogen or its substitutes. The sulfur may now be filtered off and, by the process hereinafter described, the ammonium thionates may then be converted into sulfate, with the simultaneous separation of sulfur. It is however preferable to first effect the conversion of the thiosulfate first into polythionate and then into sulfate, or directly into sulfate, and only then to filter off the sulfur separated by this process.

I may carry out my invention as described in the following several examples. But I do not, of course, limit myself to the particular ways described hereafter, the ways to carry out the invention may vary, according to the conditions and proportions in which the substances to be combined, will be present.

If coal gases, for instance, be subjected to the process and gaseous sulfurous acid, of any origin, and in any condition as regards concentration, is to be used for treatment, the way of this treatment will vary according to the proportion of ammonia and sulfureted hydrogen contained in the coal gas.

Let it first be presumed, that the gas contains only ammonia but no sulfureted hydrogen, I will then proceed as follows: Gaseous sulfurous acid, is introduced into the gas in such proportion as is equivalent to, or exceeds the amount of ammonia in the gas, and this is simultaneously washed with water or with a liquor to which sulfur is added. The amount of sulfur added must be at least equivalent to or exceed the amount of ammonia in the gas. Instead of adding free sulfur, I may introduce into the gas or into the washing liquor a sulfur yielding substance, sulfureted hydrogen or any sulfid. If I add ammonia-monosulfid for instance, such an amount must be added, that the proportion of ammonia in it is at least equivalent to, or exceeds the double by weight of the ammonia in the gas. I may also dissolve sulfur in the monosulfid or I may use a polysulfid. In this case, the amount of the sulfid introduced may be diminished, according to the amount of sulfur dissolved. In any case, the amount of sulfurous acid introduced into the gas must be increased at least in the proportion of 3 to 1 by weight of the ammonia added in the form of sulfid or polysulfid.

Let it further be presumed, that the coal gas, besides ammonia contains sulfureted hydrogen. In this case on one proportion by weight of sulfureted hydrogen contained in the gas, the amount of the sulfurous acid introduced must be increased at least for one proportion by weight. Part of the sulfurous acid will then act upon sulfureted hydrogen in yielding free sulfur, which will combine with other part of sulfurous acid and with ammonia to form thiosulfate of ammonia. The amount of sulfur, or a sulfur yielding substance to be added may therefore be diminished. But as the action of sulfurous acid on sulfureted hydrogen is a slow one, there must be added so much sulfur, or a sulfur yielding substance, that in any case sulfur is in excess and no sulfite is formed.

The sulfurous acid will be in a very diluted form, after being mixed with the coal gas, therefore its absorption by the washing liquor will be a slow one. Therefore, instead of introducing sulfurous acid into the gas, I prefer to absorb it in water or in any salt solution, for instance in an ammonia salt solution, and then to treat the gas with this liquor. The proportions of sulfurous acid and of sulfur or sulfur yielding substance will be the same as above stated. I may also extract the ammonia from the gas by washing it with water and then, with the ammonia water thus obtained, treat gases, or vapors, containing sulfurous acid, sulfur or a sulfur yielding substance being added if and as far as required, the proportions being the same as above stated. If the ammonia water thus obtained, contains monosulfid or polysulfid of ammonia, the addition of sulfur or a sulfur yielding substance may be diminished accordingly.

Instead of sulfurous acid gases I may add to the washing liquor, or to the ammonia water, acid sulfites. In this case the proportion of sulfur or sulfur yielding substance must be increased according to the sulfite added, in order to combine with this in forming thiosulfate, whereas the sulfurous acid yielded from the acid sulfite acts like free sulfurous acid as above stated.

As it is difficult to add the gases or liquors in the right proportions, I prefer to add in every case an excess of sulfurous acid, or an acid-sulfite, and of sulfur or a sulfur-yielding substance. While the latter will not be lost, in case of an excess of sulfurous acid, this excess will escape uncombined, if the gases and the washing liquor are supplied to the washing apparatus in opposite direction. In this case the gas is preferably subjected to a second washing process after leaving the first water, the washing liquor used in the second water, containing ammonium thiosulfate, or an alkali, or an earth-alkali, thiosulfate. The thiosulfate will absorb the sulfurous acid contained in the gas, or which escaped from the first washing process, and polythionate will be formed. If, however, the gas and washing liquor be supplied to the washing apparatus in the same direction, the thiosulfate, formed by the reaction between the ammonia, sulfur, sulfurous acid, and occasionally sulfureted hydrogen, will, in the further course of the washing process, absorb the excess of sulfurous acid, polythionates being thereby formed. The gas and liquor will react as aforesaid, whether they be cold or hot. The temperature depends upon the temperature of the gases to be treated. If it be desired to further concentrate with ammonia salt the liquor leaving the washing apparatus, the liquor is again treated with sulfurous acid, polythionate being formed from the thiosulfate and the liquor becoming acid with free sulfurous acid, and then this solution is again passed through the washing apparatus. Sulfur is, from time to time, added to the liquor according to requirements. If the gas contains considerably more sulfureted hydrogen than corresponds to the ammonia, no further addition of sulfur is needed during the second passage, or repeated passages, of the liquor through the washing apparatus, but it is necessary that a sufficient amount of free sulfur, or of polythionate, shall be present in the lye.

By the alternating treatment of the liquor with the coal gas containing ammonia and with sulfurous acid, the liquor gradually absorbs such an amount of ammonia that it can be advantageously used for the manufacture of crystallized ammonium sulfate. For this purpose I proceed as follows: The liquor is treated with sulfurous acid of any concentration, temperature, or origin (air being added if required), and heated at the same time, or subsequently. By this treatment the thiosulfate present is in the first instance oxidized, and converted into polythionate. This treatment with sulfurous acid is continued (preferably at from 40° to 65° centigrade) until most of the thiosulfate has been oxidized to polythionate. Thereupon the liquor is more strongly heated, preferably up to boiling point, whereby the polythionates are decomposed into free sulfur and sulfate, sulfurous acid being evolved. It is not necessary, in this latter stage of the process, to introduce more sulfurous acid, but a further supply thereof will do no harm.

The sulfurous acid not absorbed in the oxidation process, as well as that evolved by the decomposition of the polythionate into sulfate can be used for the washing operation. After the oxidation of the liquor is completed, the sulfur is separated from the ammonium sulfate solution in a centrifugal apparatus, or filter press, or by decantation, or by simple draining, and, after being washed, it is used as hereinbefore stated partly as such, and partly in the form of sulfurous acid, and any excess of sulfur yielded may be utilized for other purposes. The pure solution of ammonium sulfate, which can be so readily enriched in the gas washing operation that it finally contains 40 per cent. or more of ammonium sulfate, is evaporated *in vacuo*, or in an open vessel, until it crystallizes and the ammonium sulfate is separated (which can be done in the usual manner) from the mother liquor.

Instead of sulfurous acid, I may use such salts of ammonia, an alkali, or an alkali earth, as will (as is the case with sulfites, or polythionates), on being acted upon by sulfureted hydrogen, or any other sulfid, exercise an oxidizing influence on hydrogen sulfid, with formation of thiosulfate and free sulfur.

The action of ammonium polythionate, for instance, is for the better comprehension of my invention illustrated by the following example:—Let it be presumed that ammonia from gases, or vapors, or liquids, which, besides ammonia, also contain hydrogen sulfid, is to be combined. In this case, if the hydrogen sulfid present be equal to, or in excess of, the ammonia present, the process is as follows: Coal gas for instance is treated with an acid, neutral or basic, liquor which contains ammonium polythionate. Sulfureted hydrogen, as well as ammonium sulfid, contained in the gas, exercise a reducing action on the polythionate, sulfur being thereby separated. In the first case for instance by the action of sulfureted hydrogen, ammonium thiosulfate and free sulfur are formed. In the second case, two molecular proportions of ammonium thiosulfate are directly produced by the action of one molecular proportion of ammonium sulfid on one molecular proportion of ammonium polythionate, sulfur being precipitated. If the hydrogen sulfid present exceeds the ammonia, this excess will act as aforesaid, sulfur being again precipitated:

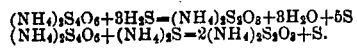

If sulfurous acid be set free by these reactions, it will combine with part of the ammonium thiosulfate formed and ammonium thionate will be regenerated.

Should the gas contain none or less hydrogen sulfid than corresponds to the ammonia present, a polythionate solution which contains free sulfur, or free sulfurous acid, or both, may be used, or, during the process of the combination of the ammonia, sulfurous acid in gaseous form may be supplied, sulfur, or sulfur-yielding substance, being added in both cases if required. The liquor obtained in this process, containing mainly ammonium thiosulfate, is then treated with sulfurous acid until the main part, or all, of the thiosulfate is converted into polythionate and this liquor may then again be used for treating the coal gas.

The alternate treatment of the liquor with the coal gas, and with sulfurous acid, is repeated until the liquor contains the desired amount of ammonia thionates. Thereupon the liquor is subjected to the hereinbefore described oxidizing process to convert the ammonium thionates into sulfate yielding thereby free sulfur and sulfurous acid. Should the gas contain only sulfureted hydrogen and no ammonia the alternate treatment of the polythionate solution with gas and sulfurous acid is the same as aforesaid. The sulfur precipitated by this treatment is from time to time filtered off from the liquor.

In all cases be it with gas containing ammonia and sulfureted hydrogen or either, it is preferable to use such an excess of polythionate solution, that in the solution leaving the washing apparatus the polythionate is not completely reduced into thiosulfate, in order to have all the sulfureted hydrogen and ammonia absorbed.

The accompanying drawing represents diagrammatically apparatus suitable for use in carrying out this invention, but I do not, of course, limit myself to this particular way and apparatus.

A is a gas washer and B is an absorption tower, C is a tank from which liquor is supplied to the washer A by a pump D.

E is a centrifugal machine.

F is a vessel hereinafter called a boiler.

G is an air compressor and N is a sulfur oven.

I will presume that the apparatus is to be used for treatment of coal gas, which contains ammonia together with an excess of sulfureted hydrogen, which are to be extracted. The coal gas enters the washer A at $a$ and is therein treated by the liquor, containing, for example, ammonium polythionate. If the gas is cold, the liquor or the gas, or both may be heated before, or during their passage through the washer A, in order to accelerate the absorption of the sulfureted hydrogen by the polythionate. By the action of this liquor, the ammonia and sulfureted hydrogen are absorbed, polythionate being reduced to thiosulfate and sulfur being precipitated. The purified gas leaves at $a^2$. The liquor is constantly pumped up, by the pump D, through the pipes $e$, $e^1$, and into the washer A. The liquor, when it leaves the washer A, contains mainly thiosulfate of ammonia and free sulfur, it enters the absorption tower B by the pipe $a^3$ and, while it runs through the said tower, air, containing sulfur dioxid, is blown through the said tower, the said air and sulfur dioxid entering at $b$. The liquor absorbs sulfur dioxid and the ammonium thiosulfate is converted into polythionates. The liquor may be slightly heated before or during its passage through the tower B in order to accelerate the formation of the polythionates. This regenerated liquor leaves the tower B by the pipe $b^3$, and enters the tank C from which it is again pumped by the pump D into the washer A. By thus constantly circulating through the washer A, and the absorption tower B, the liquor accumulates ammonia thionates.

As soon as the liquor has attained a certain strength part of it is pumped by pipes $e$ and $e^2$ to the boiler F in which the liquor is treated with sulfur dioxid in the cold, or at an elevated temperature, until all, or nearly all, of the thiosulfate is converted into polythionates. Then the liquor is decomposed by stronger heating or by boiling, sulfate of ammonia being formed, sulfur being precipitated, and sulfur dioxid being given off. The sulfur dioxid is led by the pipe $b^5$ to the absorption tower B. After the formation of the sulfate of ammonia is complete, the liquor, containing the sulfur precipitated, is discharged by the valve $f$ into the centrifugal machine E in which the sulfate of ammonia solution is separated from the sulfur. The sulfur may be burned in the sulfur oven N. For this purpose air is blown through the pipe $g$ into the said oven N by the air compressor G. The gases coming from the oven N (which gases contain sulfur dioxid, together with excess of air) enter the tower B by the pipe $b$, or the boiler F by the pipe $b^4$, and the waste gases, after having given off their sulfur dioxid to the thiosulfate liquor running through the tower B, leave this apparatus by the pipe $b^2$.

In the following claims the expression "ammonia and sulfureted hydrogen", where the context so allows, means either ammonia, or sulfureted hydrogen, or both, and the reference to matters in which they are contained includes gases, vapors, or liquids, containing ammonia or sulfureted hydrogen, or both, and the mention of the use of sulfurous acid includes also the use of substances capable of yielding sulfurous acid, or of being used in place of sulfurous acid, and the mention of sulfur includes also the use of substances capable of yielding sulfur and the expression "salts" means salts of ammonia, alkali, or earth alkali.

I claim as my invention—

1. In the absorption, by means of sulfurous acid, of ammonia and sulfureted hydrogen, from matters containing them, the step of treating such matters with the sulfurous acid in the presence of as much sulfur as is necessary to convert the ammonia combined with the sulfurous acid into thiosulfate, then converting the thiosulfate into polythionates by further treatment with sulfurous acid and decomposing these polythionates by heat into sulfate of ammonia and free sulfur, as hereinbefore explained.

2. In the absorption of ammonia and sulfureted hydrogen, from matters containing them, the step of treating a liquor containing salts alternately with sulfur dioxid and with the matters containing ammonia and sulfureted hydrogen in the presence of sulfur, as hereinbefore explained.

3. In the absorption of ammonia and sulfureted hydrogen from matters containing them and in which the ammonia is present with an excess of the sulfureted hydrogen, the treatment thereof with sulfurous acid, said acid, ammonia and sulfureted hydrogen being so proportioned that, in consequence of the recuperation of sulfur, no ammonium sulfite, but only ammonium thionate is produced, as hereinbefore explained.

4. In the absorption of ammonia and sulfureted hydrogen from matters containing them, the step of effecting the absorption of the sulfurous acid contained in the matters being treated, by means of a thiosulfate, as hereinbefore explained.

5. In the absorption of ammonia and sulfureted hydrogen from matters containing them, the step of treating alternately a solution of polythionates with the matters containing ammonia and sulfureted hydrogen and with sulfur dioxid, as hereinbefore explained.

6. In the absorption of ammonia and sulfureted hydrogen, from matters containing them, in which ammonia preponderates, the step of treating said matters alternately with a solution of polythionates to which sulfur has been added, and with sulfur dioxid, as hereinbefore explained.

7. In the absorption of ammonia and sulfureted hydrogen from matters containing them, the step of treating a solution of ammonium thionate with sulfurous acid at a temperature below boiling point so as to convert the thiosulfate present into polythionates and then oxidizing the polythionates to sulfates by heating the solution to about, or above, the boiling point, as hereinbefore explained.

In testimony whereof I have signed my name to this specification in the presence of two subscribing witnesses.

WALTHER FELD.

Witnesses:
 HENRY HASPER,
 WOLDEMAR HAUPT.